Jan. 12, 1943. M. R. MULLEN 2,307,849
PROPELLER
Filed Oct. 25, 1938 4 Sheets-Sheet 1

INVENTOR:
Milton R. Mullen,
BY Paul & Paul
ATTORNEYS.

Jan. 12, 1943. M. R. MULLEN 2,307,849
PROPELLER
Filed Oct. 25, 1938 4 Sheets-Sheet 4

INVENTOR:
Milton R. Mullen,
BY Paul & Paul
ATTORNEYS.

Patented Jan. 12, 1943

2,307,849

UNITED STATES PATENT OFFICE 2,307,849

PROPELLER

Milton R. Mullen, Philadelphia, Pa.

Application October 25, 1938, Serial No. 236,881

15 Claims. (Cl. 170—135.6)

This invention relates to propellers and more particularly to a propeller for aircraft and the like, the pitch of which may be varied or controlled in accordance with the operating conditions.

In the propeller art at present there are various forms of constant speed propellers none of which has a safe constant speed, or speed responsive variable pitch, in both forward of zero pitch, which can be called the forward or pulling quadrant, and also in the negative or reserve pitch, the reverse quadrant, where engine power tends to push the plane backward. It is true that simple reversing of a switch or a set of valves will cause the governor to have the opposite effect to normal and, by proper manipulation, serve to operate the blades in negative pitch. This, however, requires both skill and good luck to operate safely.

For instance if the propeller has been operating normally in constant speed forward and the switch or set of valves is reversed with the intention of operating in reverse pitch, a slow engine will cause the propeller to swing toward the full feathering position instead of toward zero. The result might be fatal.

It is an object of the present invention to provide a system for varying the pitch of the propeller which permits of a wide variation in adjustment of the pitch of the propeller.

It is a further object of this invention to provide a system for varying the pitch of a propeller which may be operated automatically at constant speed.

It is a further object of the present invention to provide a system for controlling the variation of pitch of a propeller embodying control by a speed responsive governor.

It is a further object of the present invention to provide a controllable pitch propeller which may be adjusted so that the power of the engine is used to produce a propelling effect or a braking effect as desired.

It is a further object of the present invention to provide a controllable pitch propeller which may be shifted as desired to a full feathering position.

It is a further object of the present invention to provide a controllable pitch propeller which may be fully and safely controlled over a wider range of movement than has heretofore been attained.

It is a further object of the present invention to provide a controllable pitch propeller which is provided with a "reverse" as well as a forward control.

It is a further object of the present invention to provide a speed responsive governor which will prevent the engine from overspeeding during adjustments of pitch by varying fuel feed to the engine to which the propeller is attached.

It is a further object of the present invention to provide a speed responsive governor which will shut-off the engine ignition in case of sudden and/or extreme overspeeding such as that due to propeller breakage.

It is a further object of the present invention to provide a propeller to which a separately powered source of oil supply can be attached for movement of the blades to the full-feathering position.

Further objects of the invention will hereinafter appear in the accompanying specification and claims.

The nature and characteristic features of the present invention will be more readily understood from the following description taken in connection with the accompanying drawings, forming part hereof, and in which:

Fig. 7 is a sectional view showing details of the newly designed valve used in Fig. 6; said section being taken approximately as indicated by the angle arrows VII—VII in Fig. 7a, which latter figure is a top plan view of the valve with a closure element removed; and, Fig. 8 is a schematic diagram of the propeller, similar to Fig. 6, with the piston rod operated valves in reverse and the pilot operated valves in forward.

It will, of course, be understood that the description and drawings herein contained are illustrative merely, and that various changes and modifications may be made in the structure disclosed without departing from the spirit of the invention.

Referring more particularly to the drawings, the propeller shaft 31 which is driven by an engine (not shown) has a hub typically illustrated in Figs. 1–6, inclusive, and 8, mounted thereon and movable therewith within which the blades 50 of the propeller are carried. The blades 50 may be mounted in the hub in any desired manner and are suitably journaled for rotation to shift the position of the leading edges of the blades 50 and change the pitch of the propeller, as hereinafter more fully referred to.

The system of the present invention has portions thereof preferably carried on a fixed portion of the plane adjacent the propeller shaft 31 and portions movable with the hub and carried in part within a housing secured to the hub. A governor G is driven by the propeller shaft 31 in any suitable manner.

The governor G may be of any desired type, but includes a movable portion 203, which changes its position in accordance with the change of speed above or below a selected level, and provisions for changing the speed level as at 200. The governor G, for any particular setting of speed level, controls the position of a movable member, such as the drive shaft 16 of a pump 10. The movable member or shaft 16 is adapted for altering the quantity and direction of oil and oil pressure produced by pump 10, as hereinafter more fully pointed out, and it is also equipped to reduce fuel supply in case of overspeeding, and to switch-off ignition in case of extreme over-speeding.

A suitable source of oil pressure such as the variable, reversible pressure oil pump 10 which is driven by the engine and controlled by the governor G, is connected to pipe lines 20, 24, 32, 35, 41, 65, 72, 77 and 81 to carry said oil pressure, pressure relief valves 87 and 90, one on each side of the pump 10 permitting excess pressure to be discharged through pipe line 91 to the oil sump or tank; check valves 85 and 88 in parallel with pressure relief valves 87 and 90 being so arranged as to permit oil to be drawn into the system through pipe 91 from the oil sump or tank.

Pipe lines 20 and 24 connect the stationary part of the system to the rotatable portion of the system through bushes 82 and 30 at the propeller drive shaft 31 to pipe lines, or drilled passages, 81 and 32.

The oil is carried through the rotatable drive shaft 31 by means of the pipes, or drilled passages, 81 and 32 and through an interconnected system of valves or other control mechanisms to a propeller blade actuating cylinder 44.

Three-way valves 33 and 74 and valves 66 and 39 are controllable by the pilot through rod or cable 3, ring 4, bearing 5, ring 6, rod 7 and valve arms 8.

Valves 36 and 70 are controlled by movement of piston shaft or rod 46 through pin 52, bracket 55, rod 56, springs 58 and 59 attached to rod 56, rod 60, and valve arms 61 attached to valves 36 and 70.

Check valve 38 permits discharge of oil from the inboard or forward actuating side of cylinder 44. Check valve 68 permits discharge of oil from outboard or reverse actuating side of cylinder 44.

Pressure of the oil within cylinder 44 actuates piston 45, causing rod 46 to move pin 52 within slot 53 of gear cylinder 47 attached to gear 48; 48 being geared through gears 49 to the hub ends of any desired number of propeller blades 50, of which, for convenience, only one is shown.

Three-way valves 33 and 74 and valves 39 and 66 have the arms 8 attached to their stems. Each of these arms 8 is fulcrumed at one end to rod 7 which is attached to ring 6, said ring preferably containing a ball bearing 5 and, at its other end, to spring 2 which normally holds rod 7 and valves 39, 66, 74, and 33 in the forward position. This ring 6, being attached to the rotating section of the system, rotates with the shaft 31.

On the stationary, or engine, side is ring 4 and rod or cable 3 which the pilot pulls to reverse valves 39, 66, 74, and 33, and through them the propeller blades 50.

Valves 36 and 70 have arms 61 attached to their stems, which stems are fulcrumed to rod 60, that is connected to rod 56. To rod 56 are attached the outer ends of springs 58 and 59. Affixed to pin 52 is bracket 55.

Movement of the piston 45, rod 46, pin 52 causes bracket 55 to slide along rod 56, pressing against and moving spring 58 or 59 until said rod 56, rod 60 and arms 61 move stems of valves 36 and 70 to forward or reverse position as desired. Excess movement of bracket 55 will only serve to further compress spring 58 or 59.

Figure 6:
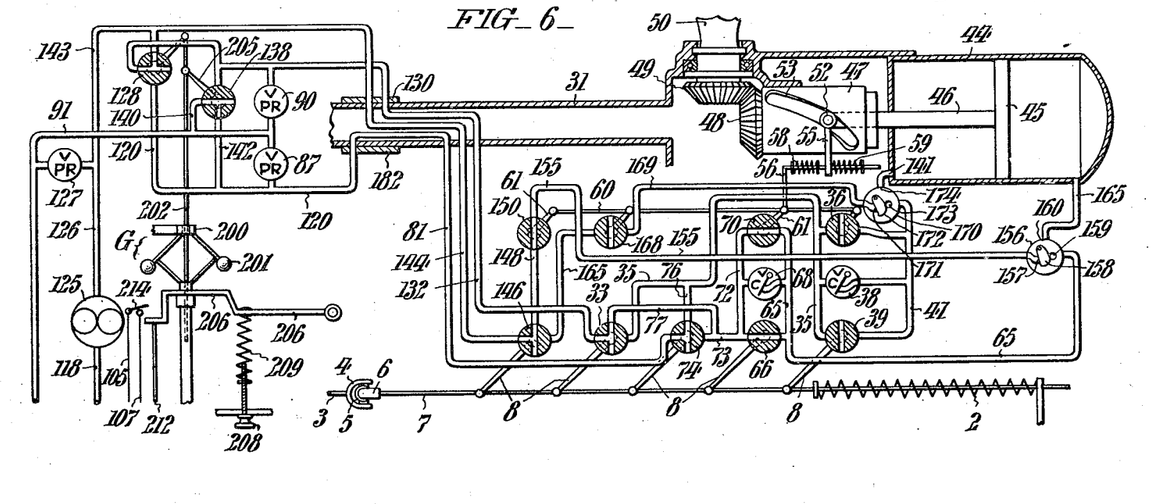
Fig. 6 is a schematic diagram of a modification of my invention in which a pipe line not controlled by the governor is used to ensure quick and immediate shifting of the blades from the forward quadrant to the reverse quadrant, or vice versa, regardless of the position of the governor. A gear pump is shown although, of course, various other forms of pumps may be used if desired. It shows the various valves necessary including a new type of valve designed to prevent pressure leakage from the governor shunting line back through the governor controlled lines. The piston, piston operated valves and propeller pitch are in the forward quadrant with the pilot operated valves set for reverse quadrant operation.
Figures 7, 7A, 8:
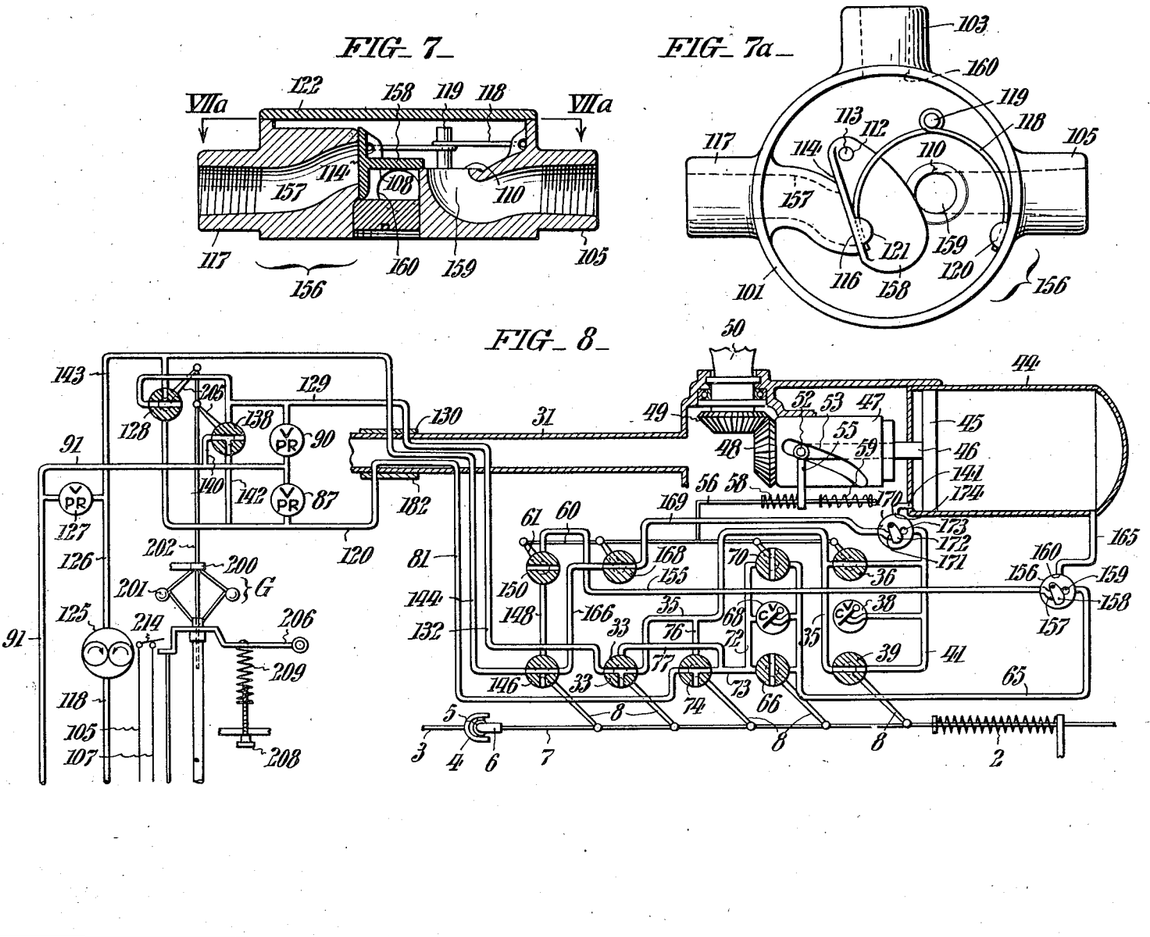

In Figures 6, 7 and 7a there is shown much of the material as in the preceding figures with certain modifications, substitutions and additions.

Gear pump 125 or other single-direction flow oil pump is substituted for variable direction flow oil pump 10. Flow from the pump 125 takes place into one of the two sides of the system through governor controlled valve 128. Another governor controlled valve 138 regulates discharge from either side of the system into pipe 91 and the oil sump or tank.

Governor shunting pipe 143, Fig. 6, is for the purpose of causing a quick shift of the propeller blades 50 from quadrant to quadrant regardless of the position of the governor G. Flow through pipe 143 is possible only when the pilot-operated valves 39, 66, 74, and 33 are set for operation in one quadrant while the piston-operated valves 36 and 70 are set for operation in the other quadrant. This flow is controlled by an additional pilot-operated valve 146 and piston operated valves 156 and 168.

The newly designed valves 156 and 178 are for the purpose of preventing the flow of the governor shunting system being diverted through the governor-controlled valve 138 to the oil sump before operating piston 45.

The purpose of valve 156 is to permit free flow in either direction between pipes 65 and 165 except when valves 146 and 150 are so set as to permit flow through pipe 155. Flow through pipe 155 and valve channel 157 will force hinged segment 158 across mouth 159, effectually checking possible flow into pipe 65. Mouth 160 into pipe 166 is open at all times. Valve 170 is similar to valve 156 and functions in the same manner.

Pressure relief valve 127 permits excess pressure, especially on the pump side of governor-controlled valve 128, to be discharged to the oil sump or tank.

Pressure relief valves 87 and 88 permit excess pressure on the cylinder sides of valves 128 and 138 to be discharged to oil sump or tank.

Governor G is fixed at collar 200. Weighted arms 201 are movably attached to collar 200. Outward or inward motion of weighted arms 201 moves rod 202 through collar 200, to operate valves 128 and 138 by means of arms 205 attached thereto, and a pivotal arm 206 to which are attached governor speed setting means 208 and spring 209, fuel control throttle rod 212 and engine ignition switch 214. Excessive engine speed during propeller blade shifting or otherwise will cause fuel supply to be reduced through throttle rod 212. Extreme overspeeding, such as due to propeller breakage, will cause arm 206 to move on its pivot and open the engine ignition switch 214.

The governor G is also equipped to prevent over-speeding of the engine during blade shifting by means of its action upon fuel control throttle rod 212.

The governor G is also equipped to prevent extreme or sudden overspeeding such as due to propeller breakage by means of governor pivotal arm 206 which opens engine ignition switch 214 at any predetermined speed. The engine ignition system passes through conductor 195, switch 214 and conductor 197, between any desired sections of the said ignition system.

The mode of operation of the system of the present invention will now be pointed out. In the normal forward operation of the airplane the leading edges of each blade 50 of the propeller are disposed in planes which are at angles forwardly inclined with respect to a plane passing through the respective longitudinal axes of the propeller blades. With a variable pitch propeller the angles or pitch may be varied as desired. For constant-speed engine operation the pitch is varied in accordance with the load on the engine so that as the load is increased, with a resultant tendency to reduce the engine speed, the pitch angle is decreased to an extent such that the engine speed will be or will remain constant. Similarly, if the load on the engine is decreased the pitch angle is increased to an extent such that the engine speed will be or will remain constant.

In addition to providing for and effecting a pitch variation as heretofore referred to, the system of the present invention provides for control and variation of the pitch with a rearward disposition of the leading edges of the propeller blades 50 for use in braking, or in rapid turning where a plurality of engines are used on the plane.

The manner in which this is effected will now be explained.

For forward constant speed operation cable 3 is released by pilot permitting spring 2 to pull rod 7 forward, and with it the several valve arms 8 connected thereto, setting valves 39, 66, 74 and 33 for forward operation.

The governor G is set, or remains set, for the desired engine speed.

Figure 1:
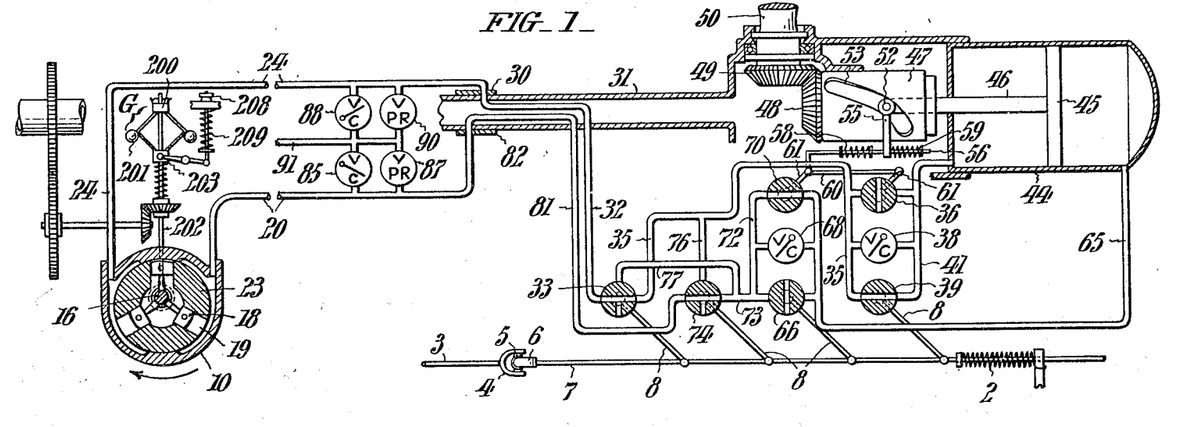
Fig. 1 is a schematic view of the propeller with the control mechanism set for normal operation in the forward quadrant.

Sequence 1, see Fig. 1.—Normal forward operation—Engine speed high, pitch increasing—Pilot-operated valves 39, 66, 74 and 33 in forward, and shaft-operated valves 36 and 70 in forward.

The remainder of the action is automatic.

Assume, for the present, that the piston 45 and blades 50 are already in the forward quadrant, that is, forward of the zero point. Valves 36 and 70 are then set for forward operation as their arms 61 have been so set by the piston rod 46, acting through the intermediate parts 52, 55, 56 and 58 previously described.

Assume that the plane is on the ground and the cold engines are being warmed with throttle set low. The blades 50 will be at, or near, zero pitch.

Wishing to start the plane forward the pilot feeds more fuel to the engine which thereupon speeds up. This causes ball arms 201 of governor G to swing out raising pump shaft 16. The pump pistons 18 are then nearest the outer ends of cylinders 19 at the top of the pump 10. The inner (rotating) section 23 of the pump 10, containing cylinders 19 and pistons 18, moves in a clockwise direction at all times as indicated by the arrow thereunder. The pistons 18 are drawn inward as they move down the right-hand side of the pump 10 drawing oil into the cylinders 19. This oil is forced out into pipe 24 as the pistons 18 move up the left side of the pump 10.

The oil thus forced into pipe 24 builds up pressure and causes circulation through said pipe, bush 30, pipe 32, pilot-operated valve 33, pipe 35, piston-operated valve 36, pipe 41, to the inboard, or forward actuating side of cylinder 44, forcing piston 45 and piston rod 46 outward. As the piston rod 46 cannot turn, pin 52 affixed to said rod and moving in slot 53 of gear cylinder 47 causes gear cylinder 47 to turn blades 50 in a forward direction.

The oil ejected from the outboard or reverse actuating end of cylinder 44 passes through pipe 65, piston operated valve 70, or check valve 68, pipe 72, pilot operated valve 74, pipe 81, bush 82 and pipe 20 to pump 10.

This movement continues until the outward moving blade 50 takes sufficient added bite of the air to increase the load on the engine and slow it. When at the desired engine speed governor G has moved shaft 16 to center of pump 10, said pump has no pumping effect.

In the above manner the pitch will be gradually increased as the plane attains the desired height and levels out at which time the blades 50 will be at about average pitch.

Note.—In a dive, or otherwise descending, the preceding cycle will be repeated until the blades 50 are at greater than average pitch.

End of Sequence 1.

Sequence 2, see Fig. 1.—Normal forward operation—Engine speed low, pitch decreasing—Pilot operated valves 39, 66, 74 and 33 in forward, and piston operated valves 36 and 70 in forward.

Then, in leveling off, the blades 50 will be taking too much bite, putting too great a load on the engine, and the engine will tend to slow down. The governor weights and shaft 16 will be lowered causing pump 10 to draw oil from pipe 24 on the left, forcing said oil into pipe 20 on the right, bush 82, pipe 81, pilot operated valve 74, pipe 73, pipe 72, piston operated valve 70 and pipe 65, to the outboard or reverse operating side of cylinder 44, forcing piston 45 inward, causing piston rod 46 to force pin 52 along slot 53 of gear cylinder 47 thereby turning blades 50 in the direction of pitch, reducing the bite of said blades and consequent load on the engine, until the latter speeds up, causing governor G to bring pump 10 to neutral position bringing blade movement to an end.

The oil ejected from the inboard or forward actuating end of cylinder 44 passes through pilot operated valve 39 or check valve 38, pipe 35, pilot operated valve 33, pipe 32, bush 30 and pipe 24 to pump 10.

End of Sequence 2.

Figure 2:
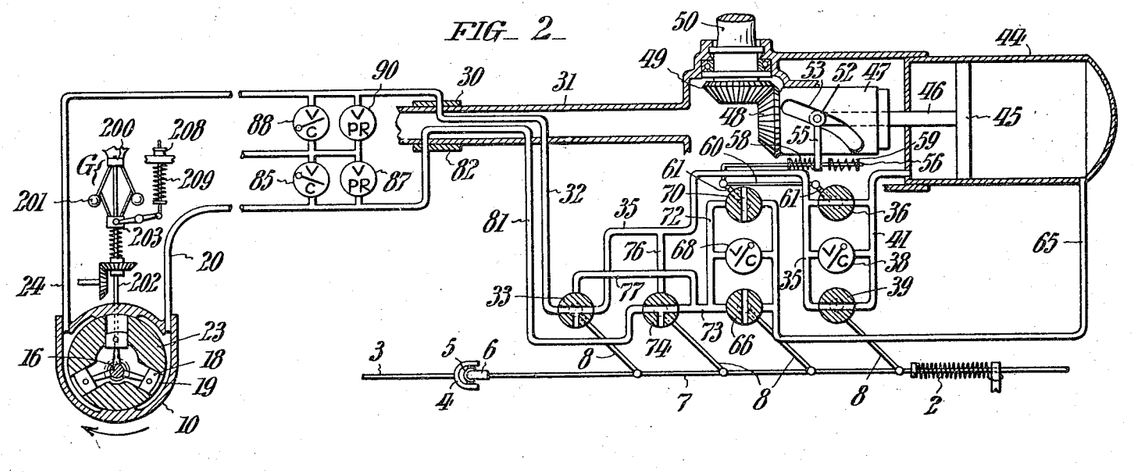
Fig. 2 is a schematic view of the propeller with the pilot operated controls set for forward operation, and with the piston rod operated controls set in reverse, and showing the piston to be on zero or in the reverse quadrant.

*Sequence 3*, see Fig. 2.—Normal forward operation—Engine speed low, pitch decreasing to below zero—Pilot operated valves 39, 66, 74 and 33 in forward, and piston operated valves 36 and 70 in forward, moving to reverse.

If, for any reason, piston 45, blades 50, would tend to pass zero, valve 70, which had been open to that point, would be closed as shown in Fig. 11. shutting-off the oil supply to the outboard, or reverse operating end of cylinder 44, effectively stopping further reverse movement. If it were not for the presence of check valve 68 in parallel, the closing of valve 70, after valve 66 had already been closed, would have permanently locked the system. Check valve 68, however, permits oil to leave the outboard, or reverse operating, side of cylinder 44 when increasing engine speed causes oil to be fed into the inboard or forward operating end of cylinder 44 moving piston 45, piston rod 46, intermediate mechanism 52, 55, 56 and 58, valves 70 and 36 to forward position beginning Sequence 1.

End of Sequence 3.

Now assume that the pilot has landed, or is about to land, the plane and wishes to use the braking effect of having the pitch of the blades 50 reversed so that with the engine moving in the same direction, said blades will be pushing backward instead of pulling forward.

The pilot will pull rod or cable 3, ring 4, engaging bearing 5, ring 6, rod 7, valve arms 8, moving valves 33, 74, 66 and 39 to the position for operation in the negative or reverse quadrant. Piston-operated valves 36 and 70 will be in position for forward operation.

Figure 4:
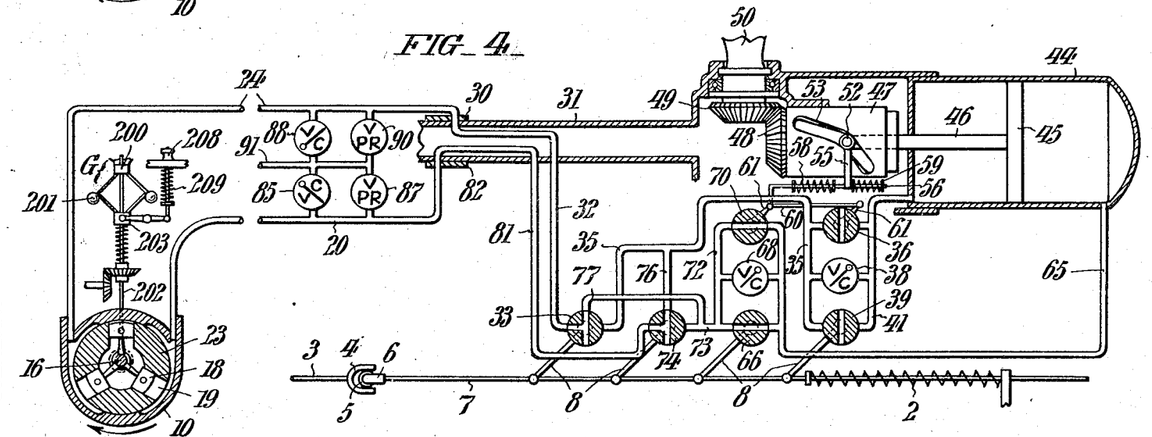
Fig. 4 is a schematic diagram of the propeller showing the piston (piston rod operated valves and propeller pitch) in the forward quadrant with the pilot operated controls set for reverse quadrant operation.

*Sequence 4*, see Fig. 4.—Shift from forward quadrant to reverse quadrant operation—Engine speed low, no pitch change—Pilot operated valves 39, 66, 74 and 33 in reverse, and piston operated valves 36 and 70 forward.

If the engine happens to be running slow there will be no movement of the blades 50 because, while pressure built up on the right hand side of pump 10 could pass through pipe 20, bush 82, pipe 81, pilot operated valve 74, pipe 76 and to pipe 35, it cannot pass piston-operated valve 36 or pilot operated valve 39, therefore the output of the pump 10 will be discharged through pressure release valve 87 and pipe 91 to oil sump or tank. The other side of pump 10 will draw oil through check valve 88 and pipe 91, from oil sump on tank.

End of Sequence 4.

*Sequence 5*, see Fig. 4.—Shift from forward quadrant to reverse quadrant operation—Engine speed high, pitch changing from forward through zero to increasing outward or reverse pitch— Pilot operated valves, 39, 66, 74 and 33, clamped in reverse, shaft, and piston operated valves 36 and 70 in forward.

If the engine happens to be running fast, or is speeded-up by the pilot, pressure will be built up on the left-hand side of pump 10. Oil will travel through pipe 24, bush 30, pipe 32, valve 33, pipe 77, pipe 73, valve 66 and pipe 65 to the outboard or reversing end of cylinder 44.

Oil from the inboard or forward end of the cylinder 44 cannot be ejected through closed valves 36 or 39. If it were not for the check valve 38 in parallel with valves 36 and 39, there would be a permanent locking of the system.

However the check valve 38 is in the system and does furnish an outlet through pipes 35, valve 74, pipe 81, bush 82 and pipe 20 to pump 10. This permits piston 45, and intermediate mechanism 52, 55, 56, 58 and 47 to move the blades 50 to reverse quadrant, carrying the piston operated valves 36 and 70 to reverse positions for continued operation in the reverse quadrant.

End of Sequence 5.

Figure 3:
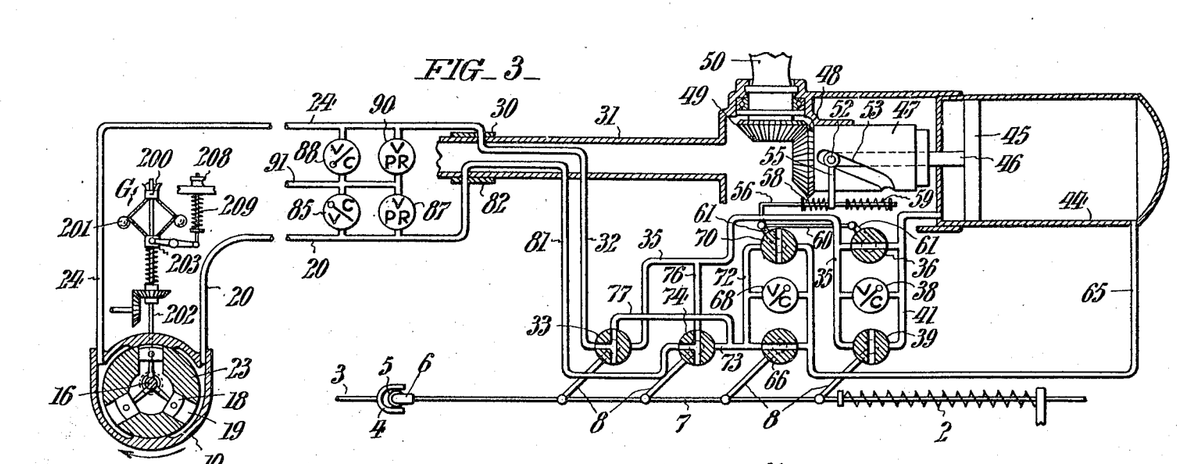
Fig. 3 is a schematic diagram of the propeller with controls set for normal operation in the reverse quadrant.

*Sequence 6*, see Fig. 3.—Normal reverse operation—Engine speed high, pitch changing outward to increasing reverse pitch—Pilot operated valves 39, 66, 74 and 33 clamped in reverse, and piston operated valves 36, 70 in reverse. Assume the plane is landing and the engine or engines are used with reversed propeller blade pitch for braking.

As the forward speed of the plane is reduced there will be less air pressure against the reversed propeller blades, less load on the engine and the engine will tend to speed-up.

Governor G will move drive shaft 16 of pump 10 upward causing pistons 18 to suck oil in from pipe 20 forcing the oil into pipe 24, bush 30, pipe 32, valve 33, pipe 77, pipe 73, pilot operated valve 66 and pipe 65 to outboard or reversing end of cylinder 44, forcing piston 45, piston rod 46, pin 52 in a reverse direction causing pin 52 to turn gear cylinder 47, gear 48, gear 49 and blades 50 in the reverse direction, taking a bigger bite of the air, increasing the engine load, slowing engine to desired constant speed where shaft 16 of pump 16 is moved by governor G to dead center, ceasing pumping effect of pump 10 and ceasing further movement of blades 50.

Oil forced out of forward operating end of cylinder 44 passes through pipe 41, piston operated valve 36 or check valve 38 to pipe 35, pipe 76, pilot operated valve 74, pipe 81, bush 82 and pipe 20 to pump.

End of Sequence 6.

*Sequence 7*, see Fig. 3.—Normal reverse operation—Engine speed low—Pitch changing inward to decreasing reverse pitch—Pilot operated valves 39, 66, 74 and 33 clamped in reverse, and piston operated valves 36, 70 in reverse.

The pilot regulates plane speed in landing by varying fuel feed to engine or engines. He may so cut throttle as to reduce reverse pitch of blades, in which case the following will occur:

Governor G lowers pump drive shaft 16 to beyond center causing pistons 18 to draw oil from pipe 24 forcing it to pipe 20, bush 82, pipe 81, pilot operated valve 74, pipe 76, pipe 35, piston operated valve 36 and pipe 41, to the inboard or forward operating end of cylinder 44, moving piston 45 and blades 50, etc., in a forward direction or toward "zero" in a direction of decreased pitch.

Oil from the outboard side of cylinder passes through pipe 65, pilot operated valve 66 or check valve 68 to pipe 72, pipe 73, pipe 77, pilot operated valve 33, pipe 32, bush 30 and pipe 24 to pump 10.

End of Sequence 7.

Figure 5:
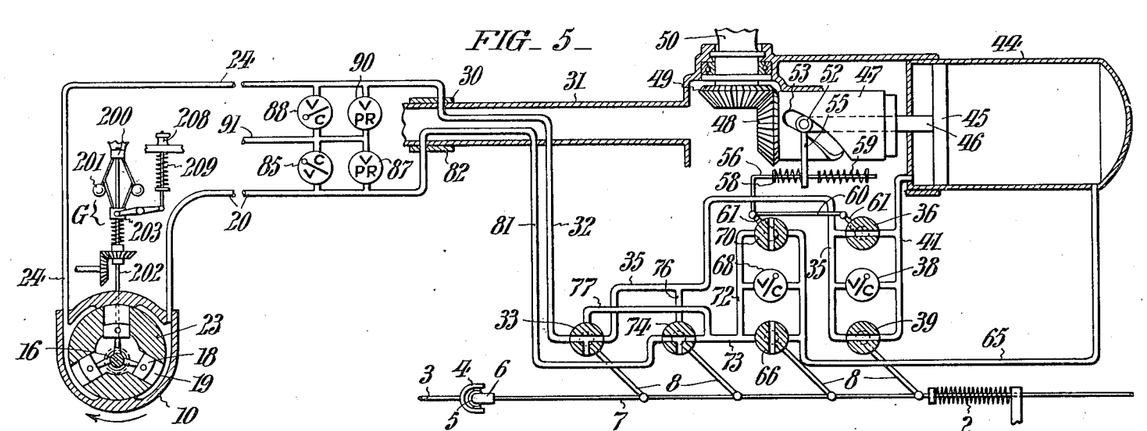
Fig. 5 is a schematic diagram of the propeller with the piston (piston rod operated valves and propeller pitch) in the reverse quadrant and the pilot operated valves set for operation in the forward quadrant.

*Sequence 8*, see Fig. 5.—Shift from reverse to forward quadrants—Engine speed low, no pitch change—Pilot operated valves 39, 66, 74 and 33 in forward, and piston operated valves 36 and 70 in reverse.

The blades 50 have been operating in reverse and it is desired to change to forward operation.

The pilot releases rod 3 permitting spring 2 to draw rod 7 and attached valve arms 8, moves the valves 33, 74, 66 and 39 to the forward position, while the piston operated valves 70 and 36 are in reverse position.

If the engine is slow there will be no change in position of the blades 50 as oil from the right hand side of the pump 10, which is the low engine speed side, although it could pass through pilot operated valve 74 and pipe 73 and pipe 72, cannot pass pilot operated valve 66, check valve 68 or piston operated valve 70.

The oil will, therefore, be discharged through pressure release valve 87 to pipe 91 and oil sump.

The other side of pump 10 will draw through check valve 88 from pipe 91 and oil sump.

End of Sequence 8.

*Sequence 9*, see Fig. 5.—Shift from reverse to forward quadrant. Engine speed high, pitch changing through zero to increasing forward pitch—Pilot operated valves 39, 66, 74 and 33, in forward, and piston operated valves 36 and 70 in reverse moving to forward.

If the engine is fast or is speeded, oil from the left-hand, or high engine speed, side of pump 10 will pass through pipe 24, bush 30, pipe 32, pilot-operated valve 33, pipe 35, piston-operated valve 36 or pilot-operated valve 39 and pipe 41 to the inboard or forward operating side of cylinder 44, moving piston 45 and associated parts 52, 55, 56, 58 and 47 to effect turning of the blades 50 toward the forward quadrant, oil from the outboard end of cylinder 44 returning to the pump through check valve 68 etc.

As piston 45 and blades 50 pass through zero position, piston operated valves 70 and 36 will be shifted to position of forward operation.

Before the above shift of piston operated valves 70 and 36, oil from outboard side of cylinder 44 cannot pass through pilot operated valve 66 or piston operated valve 70.

After above shift of the piston operated valves 70 and 36 oil can pass either into or out of outboard end of cylinder 44 through piston operated valve 70 permitting normal plus or minus operation in the forward quadrant.

End of Sequence 9.

It would appear from the preceding sequences that pressure relief valve 90 and check valve 85 have no function in Figs. 1, 2, 3, 4 and 5 and could be dispensed with. They are included, however, as a possible safeguard against unforeseen contingencies.

The operation of the modification of my invention as shown in Figs. 6 and 8 is similar to that of the preceding "sequences" except that variable inflow is governed through valve 128 and variable outflow through valve 138 and except for the addition of the governor shunting system.

As the governor shunting system functions only during shift of the blades 50 from quadrant to quadrant and as it does not otherwise affect the functioning of the system described in the preceding "sequences," its operation will be described only during such shifting.

*Sequence 10*, see Fig. 6.—Governor shunting system included—Shift from forward to reverse quadrant—Engine speed low, pitch changing through "zero" to increasing outward or reverse pitch.—Pilot operated valves 39, 66, 74, 33 and 146 in reverse, and piston operated valves 36, 70, 168 and 150 in forward.

The engine running slow, governor controlled valve 128 permits flow from pump 125 and pipe 126, pipe 143, valve 128, pipe 120, bush 182, pipe 81, valve 74, pipe 76 and pipe 35, to dead end at valves 36, 38 and 39.

At the same time a governor shunting circuit is open through pipe 143, bush 130, pipe 144, valve 146, pipe 148, valve 150, pipe 155, valve 156 and through valve channel 157, forcing hinged segment 158 from the face of channel 157 outward and cutting across mouth 159, blocking flow to or from pipe 65. Flow passes through always open mouth 160 and pipe 165, to outboard or reverse operating side of cylinder 44 forcing piston 45 in the reverse direction.

Flow from the inboard, or forward operating side of cylinder passes through pipe 141, always open mouth 174 of valve 170, mouth 173, pipe 41, check valve 38, pipe 35, valve 74, pipe 81, bush 182, pipe 120, pipe 142, valve 138, pipe 140 and pipe 91 to oil sump or tank.

As the piston 45 and blades 50 pass "zero," valve 168, in the governor shunting system, is closed, permitting hinged segment 172 of valve 170 to swing against mouth 171 and from across mouth 173, permitting free flow in either direction between pipes 41 and 141.

The system is now in position to operate as in Fig. 3.

End of Sequence 10.

*Sequence 11*, see Fig. 8.—Governor shunting system included—Shift from reverse to forward quadrant—Engine speed low, pitch changing through "zero" to increasing outward or forward pitch—Pilot-operated valves 39, 66, 74, 33 and 146 in forward, and piston-operated valves 36, 70, 168 and 150 in reverse.

The engine being slow, governor-controlled valve 128 permits flow from pipe 126, pipe 143, valve 128, pipe 120, bush 182, pipe 81, valve 74, pipe 73 and pipe 72 to dead end at valves 66, 68 and 70.

At the same time pressure may travel through pipe 143, bush 130, pipe 144, valve 146, pipe 166, valve 168, pipe 169, valve 170, valve channel 171, forcing hinged segment 172 across mouth 173 and effectually closing connection to pipe 41. Oil pressure continues through always open mouth 174 and pipe 141 to the inboard or forward operating end of cylinder 44, forcing piston 45 forward. Oil from the outboard side of cylinder 44 passes through pipe 165, into valve 156 through always open mouth 160, mouth 159, pipe 65, check valve 68, pipe 72, pipe 73, valve 74, pipe 81, bush 182, pipe 120, pipe 142, valve 138, pipe 140 and pipe 91 to oil sump or tank.

As piston 45 passes "zero" position, valves 150, 168, 70 and 36 are shifted to forward operating position, closing governor shunting oil flow through pipe 169, etc., permitting hinged segment 172 of valve 170 to swing against mouth of channel 171, opening mouth 173 connected to pipe 41 and permitting free flow in either direction between pipe 41 and pipe 141.

This system is now adapted to operate as in Fig. 1.

End of sequence 11.

Figs 7 and 7a illustrate the special valves 156 and 170. 101 is the body of the valve 156 or 170;

103 is an always open fitting and 160 the mouth thereof, fluid or gas passing through which meets with no obstruction; 105 is a fitting connecting with mouth 159, the face 110 of which is finished in a plane parallel with the flat, finished surface 108 of a hinged segment 158. Hinged segment 158 may rest upon face 110 or surface 111 of the valve body interior. Hinged segment 158 is provided with a hole 112 by which it is swingably mounted on a pin 113 which is attached in the valve body 101. At 90° to surface 108 of segment 158 is a surface 114 which normally rests against the mouth face 116 of a fitting 117 defining the channel or mouth 157, the face 116 of said mouth 157, forming a reasonably fluid tight fit with the surface 114. Face 116 of mouth 157 is finished in a plane parallel with surface 14 of segment 158. A spring 118 on a pin 119 attached in valve body 101, in contact with wall of valve interior and outer surface 121 of segment 158 may be used, if desired, to insure contact of surface 114 of segment 158 with mouth face 116. When in this position segment 158 may rest upon portions 110 and 111 of interior of valve body 101. The whole is enclosed in any desired manner as by a cover 122, Fig. 7.

The operation of the valve 156 or 170 just described is as follows:

Mouth 160 is always open furnishing an unobstructed passage to fluid. Mouth 159 is normally open except when fluid from mouth 157 forces surface 114 of segment 158 away from said mouth, causing surface 108 of segment 158 to cross face 110 of mouth 159 forming a reasonably fluid tight contact therewith, and thus providing free passage for fluid or gas from the mouth 157 to mouth 160.

I claim:

1. In the combination of a controllable pitch propeller and a shaft for driving said propeller; means for mounting the blades permitting variation of the pitch thereof; means for varying the pitch of said blades comprising a fluid motor for shifting said blades and a means for controlling the direction of operation of said motor, said control means including a governor, operable in accordance with the speed of the propeller shaft, controlling a set of valves; a second set of valves controlled in accordance with the position of the blades; a third set of manually controlled valves; and a valve controlled by the flow of fluid independent of the governor; engine throttle valve control means operated by the governor to close the throttle valve on excessive speed of the engine; and means to shut-off the ignition of the engine on extremely excessive speed of said engine.

2. In combination, a hub, propeller blades mounted on the hub for change of their pitch; a fluid motor connected to said blades for change of their pitch; at least one pump; a speed governor; at least one governor actuated valve; a manually operable set of valves; a set of valves operable with the blades; all of said valves being arranged to form a governor controlled system in which there is a valve actuated with the blades to close a passage to the outboard side of the motor; a manually operable valve to close a parallel passage to the outboard side of the motor; a check valve in a parallel passage to the outboard side of the motor arranged to permit fluid flow only from and not to the outboard side of the motor; a valve actuated with the blades to close a passage to the inboard side of the motor; a manually operable valve to close a parallel passage to the inboard side of the motor; and a check valve in a parallel passage to the inboard side of the motor arranged to permit flow only from, and not to, the inboard side of the motor, whereby governor controlled blade movements in either direction occur within a range of pitch angles appropriate to the position of the manually operable set of valves.

3. In combination: a hub; propeller blades mounted on the hub for change of their pitch; a fluid motor connected to said blades for change of their pitch; at least one pump; a speed governor; at least one governor actuated valve; a manually operable set of valves; a set of valves operable with the blades; all of said valves being arranged to form a governor controlled system, and a system independent of the governor; said governor controlled valve system including a valve actuated with the blades to close a passage to the outboard side of the motor; a manually operable valve to close a governor controlled parallel passage to the outboard side of the motor; a check valve in a third parallel passage to the outboard side of the motor arranged to permit fluid flow only from the outboard side of said motor; a valve actuated with the blades to close a passage to the inboard side of the motor; a manually operable valve to close a parallel passage to the inboard side of the motor; a check valve in a parallel passage to the inboard side of the motor arranged to permit fluid flow only from the inboard side of the motor whereby governor controlled blade movements in either direction occur within a range of pitch angles appropriate to the position of the manually operable set of valves; a pump in said valve system independent of the governor; a passage not controlled by the governor with a manually operable valve therein; two valves operable with the blades and connectable with said passage, each of said valves being connectable with the motor through a special valve which prevents diversion of the fluid flow from between said valve and said motor; one of said valves being always open to connection with said passage and the other being always closed to connection with said passage; said valves being in such positions that when the propeller blades are in a range of pitch angles other than that appropriate to the position of the manually operable set of valves, fluid may pass through said passage to operate the motor to bring said blades into zero pitch angles; and the pitch of said blades being controllable by fluid flow through the governor controlled valve system when said valves are in a range of pitch angles appropriate to the position of the manually operable set of valves.

4. In combination: a hub; propeller blades mounted on the hub for change of pitch; a fluid motor connected to said blades for changing their pitch; at least one pump; a system of conduits between said pump and motor comprising three passages; valves in two of said passages; a speed governor controlling said valves; a manually operable set of valves in said passages for reversing the direction of the flow of fluid from said pump to said motor; two valves connectable with the third of said passages, which third passage is not controlled by said governor; means connecting said two valves with the motor, one of said valves being always open to said third passage and the other always closed to said third passage; said valves being in such positions that when the blades are in a range of pitch angles other than that appropriate to the position of the manually operable set of valves, fluid may pass through said third passage to operate the motor to bring the blades into a range of pitch angles appropriate to the position of the manually operable valves; the pitch of said blades being controllable by fluid flowing through the governor controlled valves when said blades are in a range of pitch angles appropriate to the position of the manually operable set of valves.

5. In combination: a hub; propeller blades mounted on the hub for change of pitch; a fluid motor connected to said blades for changing their pitch; at least one pump; a system of conduits between said pump and motor comprising three passages; valves in two of said passages; a speed governor controlling said valves; a manually operable set of valves in said passages for reversing the direction of the flow of fluid from said pump to said motor; two valves connectable with the third of said passages, said third passage not being controlled by said governor; means connecting said two valves with said motor, one of said valves being always open to said third passage and the other always closed to said third passage, said valves being in such positions that when the blades are in a range of pitch angles other than that appropriate to the position of the manually operable set of valves, fluid may pass through said third passage to operate the motor to bring the blades into the pre-set minimum governor controlled pitch angles; and the pitch of said blades being controllable by fluid flow through the governor controlled valves when said blades are in a range of pitch angles appropriate to the position of the manually operable set of valves.

6. In combination, a hub; propeller blades mounted on the hub; a fluid motor connected to the blades for changing their pitch; at least one pump; a system of conduits between said pump and motor comprising three passages; a governor; at least one valve controlled by said governor and regulating the fluid flowing in two of said passages; a manually operable set of valves in said passages for reversing the direction of fluid flowing from said pump to said motor; a set of valves in said passages operable with the blades to prevent blade movement to a range of pitch angles other than that appropriate to the manually operable set of valves; check valves to permit outward flow of fluid from the respective ends of the motor; two valves connectable with the third of said passages, which third passage is not controlled by the governor; means connecting said last mentioned two valves with said motor, one of said valves being open to said third passage when the other is closed to said third passage; said valves being in such positions that, when the blades are in the range of pitch angles other than that appropriate to the position of the manually operable set of valves, fluid may pass through said third passage, and through a valve operable by flow from said third passage to close an otherwise open passage, and through a passage to the motor to operate said motor to bring the blades into zero pitch angles; and the pitch of said blades being controllable by fluid flowing through the governor controlled valves when the blades are in a range of pitch angles appropriate to the position of the manually operable set of valves.

7. In combination a hub, propeller blades mounted on the hub for change of pitch; a fluid motor connected to said blades for changing their pitch; a pump; a speed governor controlling operation of the pump; a system of conduits between said pump and motor comprising two passages; check valves in said passages for controlling outward flow from the respective ends of the fluid motor; a manually operable set of valves in the system for reversing the direction of the flow of fluid from said pump to said motor; two other valves, in the system, operatively controlled in accordance with the position of the propeller blades, for connecting said two valves with the fluid motor, one of said valves being open to said passage when the other is closed to said passage; said respective valves being in such positions that when the blades are in a range of pitch angles other than that appropriate to the position of the manually operable set of valves, fluid may pass through one of the passages to operate the motor to bring the blades into a range of pitch angles appropriate to the position of the manually operable valves, and the pitch of said blades being controllable by fluid flowing through the valves when said blades are in a range of pitch angles appropriate to the position of the manually operable set of valves.

8. The combination of claim 7, wherein the pump is of the reversible pressure type including a unidirectional rotor; circumferentially spaced radial cylinders in said rotor; pistons in said cylinders operatively coupled to a common shifter; and means whereby said shifter is vertically movable under control of the governor to effect reversal of the pressure flow through the pump.

9. In combination, a controllable pitch propeller, a hub; blades mounted thereon; a governor; fluid pressure supply means controlled by the governor to vary the flow of said fluid pressure; valve means manually operable to select the desired pitch angle range; valve means operable with the blades and cooperative with said manually operable valve means to limit two-directional blade movement to the pitch angles appropriate to the position of the manually operable valve means; and check valve means effective to permit other blade movement only toward the pitch angles appropriate to the position of said manually operable valve means.

10. In combination, in a controllable pitch propeller, a hub; blades mounted thereon; a governor; fluid pressure supply means controlled by the governor to vary the flow of said fluid pressure; fluid pressure supply means independent of the governor; manually operable adjustable valves to select the desired pitch angle range; valves operable with the blades and cooperating with the aforesaid manually operable valves to limit the automatically variable blade movement to the pitch angles appropriate to the position of the manually operable valves as adjustably preset, for example the minimum negative automatically variable pitch.

11. In combination, in a controllable pitch propeller, a hub; blades mounted thereon for variation of the pitch angles; a governor; a fluid motor connected to said blades for varying their pitch; a pressure fluid supply means operative to accomplish change of pitch angles under control of the governor; a pressure fluid supply line to accomplish change of pitch angles independently of the governor; manually operable valve means to reverse the direction of the application of power to change the pitch angles; valves operable with the blades and cooperating with the manually operable valve means to limit control, within any desired range of pitch angles, of the governor controlled pressure fluid supply, and means independent of governor control for changing said ranges of pitch angles, which may be of any desired minimum and maximum magnitude with respect to zero.

12. In combination, in a controllable pitch propeller, a hub; propeller blades mounted thereon for change of their pitch; a speed responsive governor; a fluid motor with associated means, connected to said blades, for changing their pitch; a pressure fluid supply line controlled by the speed responsive governor; a pressure fluid supply line independent of the governor; manually operable valves to select the desired range of pitch angles by reversing the direction of the pressure fluid flowing to the motor when it is so desired; valves operable with the blades and cooperating with the said manually operable valves for actuating the motor, independently of governor control, to effect movement from without the range of pitch angles appropriate to the position of the said manually operable means to within a pre-selected minimum of the pitch ranges appropriate to the position of said manually operable means; and means for application of governor controlled power within the automatically variable pitch ranges appropriate to the position of the said manually operable valves.

13. In combination, in a controllable pitch propeller, a hub; propeller blades mounted thereon for change of their pitch; a motor connected to said blades for changing their pitch; a speed responsive governor; a power supply to the motor controlled by said speed responsive governor; a power supply to said motor independent of the governor control; manually operable means in the first mentioned supply to select the desired range of pitch angles by reversing the direction of power supply to the motor when it is so desired; means operable with the blades and cooperating with the said manually operable means for application of power to the motor, independent of the governor, to produce movement of the blades from without the range of pitch angles appropriate to the position of the said manually operable means to within a pre-selected minimum of said pitch ranges, and appropriate to the position of the manually operable means; and means for application of governor controlled power within the automatically variable pitch ranges appropriate to the position of the said manually operable means.

14. In combination, in a controllable pitch propeller, a hub; propeller blades mounted thereon for change of their pitch; a fluid motor connected to said blades for changing their pitch; a speed responsive governor; a pressure fluid supply line controlled by the speed responsive governor; a pressure fluid supply line independent of control by the governor; manually operable valves to select the desired range of pitch angles; valves operable with the blades and cooperating with the said manually operable valves to effect supply of the pressure fluid independently of the governor to the motor for effecting movement of the propeller blades, from without to within, the pre-selected minimum pitch ranges appropriate to the position of said manually operable means; and means to effect application of governor controlled pressure fluid to the motor for effecting other movements within the automatically variable pitch ranges appropriate to the position of the said manually operable valves.

15. In combination, in a controllable pitch propeller, a hub; propeller blades mounted thereon for change of their pitch; a fluid motor connected to said blades for changing their pitch; a speed responsive governor; a pressure fluid supply line controlled by the speed responsive governor; manually operable valves to select the desired range of pitch angles; valves operable with the blades and cooperating with said manually operable valves for controlling supply of governor controlled pressure fluid to the motor for effecting blade movements within the automatically variable pitch ranges appropriate to the position of the said manually operable means; and means for effecting movement of said blades from outside the pitch ranges appropriate to the position of the said manually operable means only toward said pitch ranges appropriate to the position of the manually operable valves.

MILTON R. MULLEN.